(12) United States Patent
Perez Rua et al.

(10) Patent No.: US 11,797,824 B2
(45) Date of Patent: Oct. 24, 2023

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Juan Manuel Perez Rua, Staines (GB); Tao Xiang, Staines (GB); Timothy Hospedales, Staines (GB); Xiatian Zhu, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 341 days.

(21) Appl. No.: 16/901,685

(22) Filed: Jun. 15, 2020

(65) Prior Publication Data

US 2021/0125026 A1 Apr. 29, 2021

(30) Foreign Application Priority Data

Oct. 29, 2019 (GB) .................................. 1915637.1
Mar. 25, 2020 (KR) ........................ 10-2020-0036344

(51) Int. Cl.
| | |
|---|---|
| *G06N 3/04* | (2023.01) |
| *G06N 3/08* | (2023.01) |
| *G06F 3/01* | (2006.01) |
| *G06N 3/084* | (2023.01) |
| *G06N 3/044* | (2023.01) |
| *G06N 3/045* | (2023.01) |

(52) U.S. Cl.
CPC .............. *G06N 3/04* (2013.01); *G06F 3/011* (2013.01); *G06N 3/08* (2013.01); *G06N 3/084* (2013.01); *G06N 3/044* (2023.01); *G06N 3/045* (2023.01)

(58) Field of Classification Search
None
See application file for complete search history.

(56) References Cited

U.S. PATENT DOCUMENTS

| | | | |
|---|---|---|---|
| 10,503,775 B1 * | 12/2019 | Ranzinger | .............. G06N 3/045 |
| 10,546,209 B2 | 1/2020 | Lee et al. | |
| 10,824,916 B2 * | 11/2020 | Sikka | ..................... G06N 3/045 |
| 2010/0177956 A1 | 7/2010 | Cooper et al. | |

(Continued)

FOREIGN PATENT DOCUMENTS

| | | |
|---|---|---|
| EP | 2689650 A1 | 1/2014 |
| JP | 2019-128804 A | 8/2019 |

(Continued)

OTHER PUBLICATIONS

International Search Report (PCT/ISA/210), issued by International Searching Authority in corresponding International Application No. PCT/KR2020/007560, dated Sep. 9, 2020.

(Continued)

*Primary Examiner* — Jiangeng Sun
(74) *Attorney, Agent, or Firm* — Sughrue Mion, PLLC

(57) ABSTRACT

An electronic apparatus and a method for controlling the electronic apparatus are disclosed. The method includes: obtaining a neural network model trained to detect an object corresponding to at least one class; obtaining a user command for detecting a first object corresponding to a first class; and based on the first object not corresponding to the at least one class, obtaining a new neural network model based on the neural network model and information of the first object.

20 Claims, 12 Drawing Sheets

(56) References Cited

U.S. PATENT DOCUMENTS

| | | | |
|---|---|---|---|
| 2011/0016125 A1* | 1/2011 | Kang | G06F 16/90 707/769 |
| 2015/0254532 A1 | 9/2015 | Talathi et al. | |
| 2015/0324688 A1 | 11/2015 | Wierzynski et al. | |
| 2015/0346302 A1* | 12/2015 | Hart | G01R 33/54 702/19 |
| 2016/0125273 A1* | 5/2016 | Matsunaga | G06F 18/2411 382/159 |
| 2017/0185893 A1* | 6/2017 | Wetta | G16H 40/20 |
| 2017/0220903 A1 | 8/2017 | Hertzmann et al. | |
| 2017/0220904 A1* | 8/2017 | Bai | G06V 10/764 |
| 2017/0228618 A1* | 8/2017 | Jiang | G06F 17/16 |
| 2017/0262479 A1* | 9/2017 | Chester | G06F 16/54 |
| 2017/0286997 A1 | 10/2017 | Indarapu et al. | |
| 2017/0296116 A1* | 10/2017 | McCarthy | A61B 5/112 |
| 2017/0308812 A1 | 10/2017 | Kaisser | |
| 2017/0344829 A1* | 11/2017 | Lan | G06T 7/73 |
| 2018/0039887 A1 | 2/2018 | Shaji et al. | |
| 2018/0189228 A1 | 7/2018 | Park et al. | |
| 2018/0189596 A1 | 7/2018 | Lee et al. | |
| 2018/0330238 A1 | 11/2018 | Luciw et al. | |
| 2019/0023787 A1* | 1/2019 | Diaz | C07K 16/2818 |
| 2019/0164057 A1* | 5/2019 | Doshi | G06N 3/08 |
| 2019/0304568 A1* | 10/2019 | Wei | G06N 7/01 |
| 2019/0392248 A1* | 12/2019 | Zhang | G06F 18/10 |
| 2020/0280579 A1* | 9/2020 | Terrazas Gonzalez | H04L 63/1425 |
| 2020/0285938 A1 | 9/2020 | Kim et al. | |
| 2021/0117778 A1* | 4/2021 | Doumbouya | G06N 20/10 |
| 2021/0352441 A1* | 11/2021 | Liu | H04B 17/318 |
| 2022/0148291 A1* | 5/2022 | Huang | G06N 3/045 |
| 2022/0180199 A1* | 6/2022 | Xu | G06V 10/454 |
| 2022/0189143 A1* | 6/2022 | Xie | G06V 10/82 |

FOREIGN PATENT DOCUMENTS

| | | |
|---|---|---|
| KR | 10-2018-0080051 A | 7/2018 |
| KR | 10-2019-0023787 A | 3/2019 |
| WO | 2016149147 A1 | 9/2016 |
| WO | 2019050247 A2 | 3/2019 |

OTHER PUBLICATIONS

Written Opinion (PCT/ISA/237) issued by the International Searching Authority in corresponding International Application No. PCT/KR2020/007560, dated Sep. 9, 2020.

Communication dated Apr. 27, 2020 issued by the Intellectual Property Office of Great Britain in application No. GB1915637.1.

Communication dated Mar. 15, 2022 issued by the Intellectual Property Office of the United Kingdom in Application No. GB1915637.1.

Communication dated Jul. 7, 2022 issued by the United Kingdom Intellectual Property Office in counterpart United Kingdom Application No. GB1915637.1.

P. Mangla et al., "Charting the Right Manifold: Manifold Mixup for Few-shot Learning", arXiv:1907.12087v2 [cs.LG], Aug. 7, 2019, XP055966425, (10 pages total).

B. Hariharan and R. Girshick, "Low-shot Visual Recognition by Shrinking and Hallucinating Features", 2017 IEEE International Conference on Computer Vision, Oct. 22, 2017, XP033283171, DOI: 10.1109/ICCV.2017.328, (10 pages total).

N. Bansal et al., "Can We Gain More From Orthogonality Regularizations in Training Deep CNNs?", arXiv: 1810.09102v1 [cs.LG], Oct. 22, 2018, XP081068508, (11 pages total).

Communication dated Oct. 10, 2022 issued by the European Patent Office in counterpart European Patent Application No. 20883551.2.

S. Gidaris et al., "Generating Classification Weights with GNN Denoising Autoencoders for Few-Shot Learning", May 3, 2019, 10 pages.

H. Ye et al., "Learning Classifier Synthesis for Generalized Few-Shot Learning", Jun. 7, 2019, 16 pages.

K. Cao et al., "Few-Shot Video Classification via Temporal Alignment", Jun. 27, 2019, 10 pages.

O. Vinyals et al., "Matching Networks for One Shot Learning", In Advances in neural information processing systems, 30th Conference on Neural Information Processing Systems (NIPS), Barcelona, Spain, 2016, pp. 3630-3638.

J. Snell et al., "Prototypical Networks for Few-shot Learning", In Advances in Neural Information Processing Systems, 31st Conference on Neural Information Processing Systems (NIPS), Long Beach, CA, USA, 2017, pp. 4077-4087.

H. Qi et al., "Low-Shot Learning with Imprinted Weights", In Proceedings of the IEEE Conference on Computer Vision and Pattern Recognition, 2018, pp. 5822-5830.

S. Gidaris et al., "Dynamic Few-Shot Visual Learning without Forgetting", In Proceedings of the IEEE Conference on Computer Vision and Pattern Recognition, 2018, pp. 4367-4375.

* cited by examiner

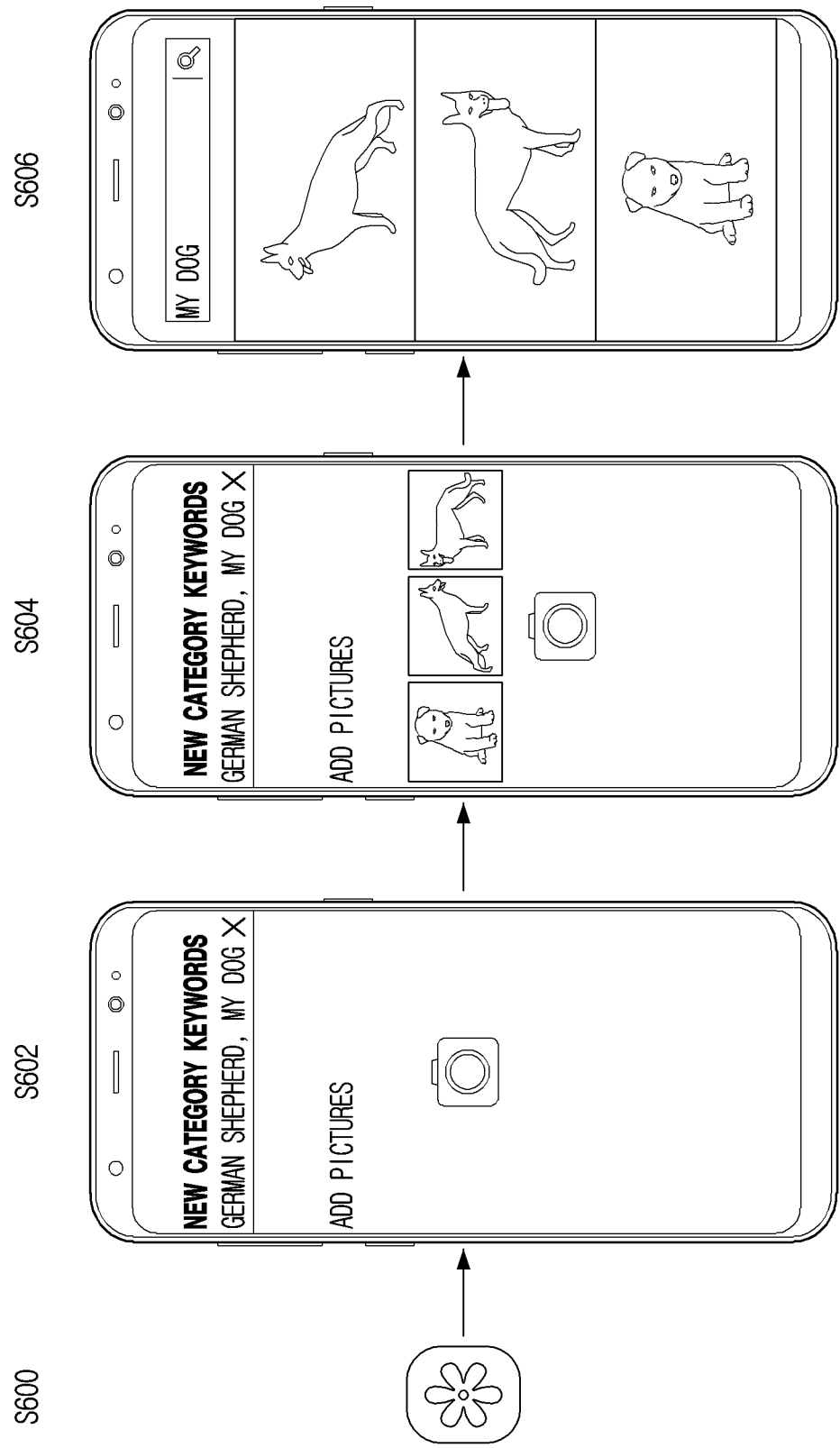

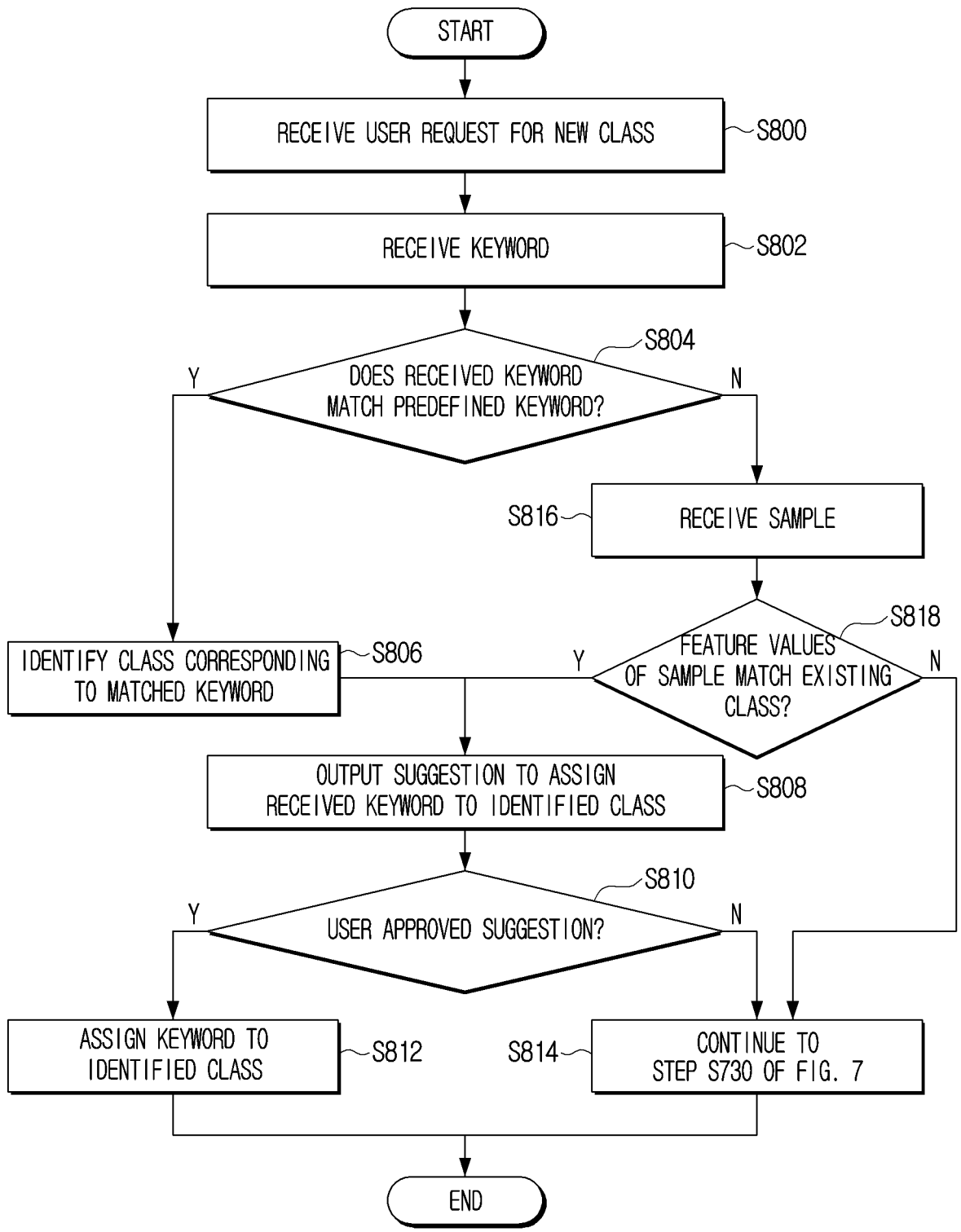

ELECTRONIC APPARATUS AND METHOD FOR CONTROLLING THEREOF

CROSS-REFERENCE TO RELATED APPLICATION(S)

This application is based on and claims priority under 35 U.S.C. § 119 to Great Britain Patent Application No. 1915637.1, filed on Oct. 29, 2019, in the Intellectual Property Office of the United Kingdom, and Korean Patent Application No. 10-2020-0036344, filed on Mar. 25, 2020, in the Korean Intellectual Property Office, the disclosures of which are incorporated by reference herein in their entireties.

BACKGROUND

1. Field

The disclosure relates to a method and system for customizing a neural network model, and in particular to methods for enabling a user to add new classes to a neural network model to customize the neural network model on their devices.

2. Description of Related Art

Generally speaking, related art artificial intelligence (AI)-based recognition models are trained offline for a fixed base set of categories or classes, and the models may then be provided to devices such as smartphones, robots/robotic devices, or any other image and/or sound recognition systems, to be implemented on those devices. The models, once trained, cannot be altered on the devices to, for example, add in new categories/classes that the model can recognize/identify. This is because related art AI-based recognition models typically require many samples of the new classes to be obtained and for the model to be retrained using both the original and new samples (which is time-consuming), and/or require the models to be retrained using cloud computing (which is expensive and therefore undesirable). However, users often desire the ability to personalize an AI model to add in classes that are relevant to the user.

SUMMARY

Provided are a method and an apparatus for customizing a neural network model locally on a device by enabling a user to add new classes to the neural network model.

Additional aspects will be set forth in part in the description which follows and, in part, will be apparent from the description, or may be learned by practice of the presented embodiments.

In accordance with an aspect of the disclosure, a method for controlling an electronic apparatus includes: obtaining a neural network model trained to detect an object corresponding to at least one class; obtaining a user command for detecting a first object corresponding to a first class; and based on the first object not corresponding to the at least one class, obtaining, by the electronic apparatus, a new neural network model based on the neural network model and information of the first object.

In accordance with another aspect of the disclosure, an electronic apparatus includes: a memory including at least one instruction; and a processor configured to execute the at least one instruction to: obtain a neural network model trained to detect an object corresponding to at least one class, obtain a user command for detecting a first object corresponding to a first class, and based on the first object not corresponding to the at least one class, obtain a new neural network model based on the neural network model and information of the first object.

In accordance with another aspect of the disclosure, a non-transitory computer-readable recording medium has recorded thereon instructions executable by at least one processor to perform a method for controlling an electronic apparatus, the method including: obtaining a neural network model trained to detect an object corresponding to at least one class; obtaining a user command for detecting a first object corresponding to a first class; and based on the first object not corresponding to the at least one class, obtaining, by the electronic apparatus, a new neural network model based on the neural network model and information of the first object.

BRIEF DESCRIPTION OF DRAWINGS

The above and other aspects, features, and advantages of certain embodiments of the present disclosure will be more apparent from the following description taken in conjunction with the accompanying drawings, in which:

FIG. 6A is a view showing a method for customizing a neural network model by using image samples according to an embodiment;

FIG. 8 is a flowchart of an example of confirming whether or not a user request class exists in a neural network model already, according to an embodiment.

DETAILED DESCRIPTION OF DRAWINGS

Figure 1:
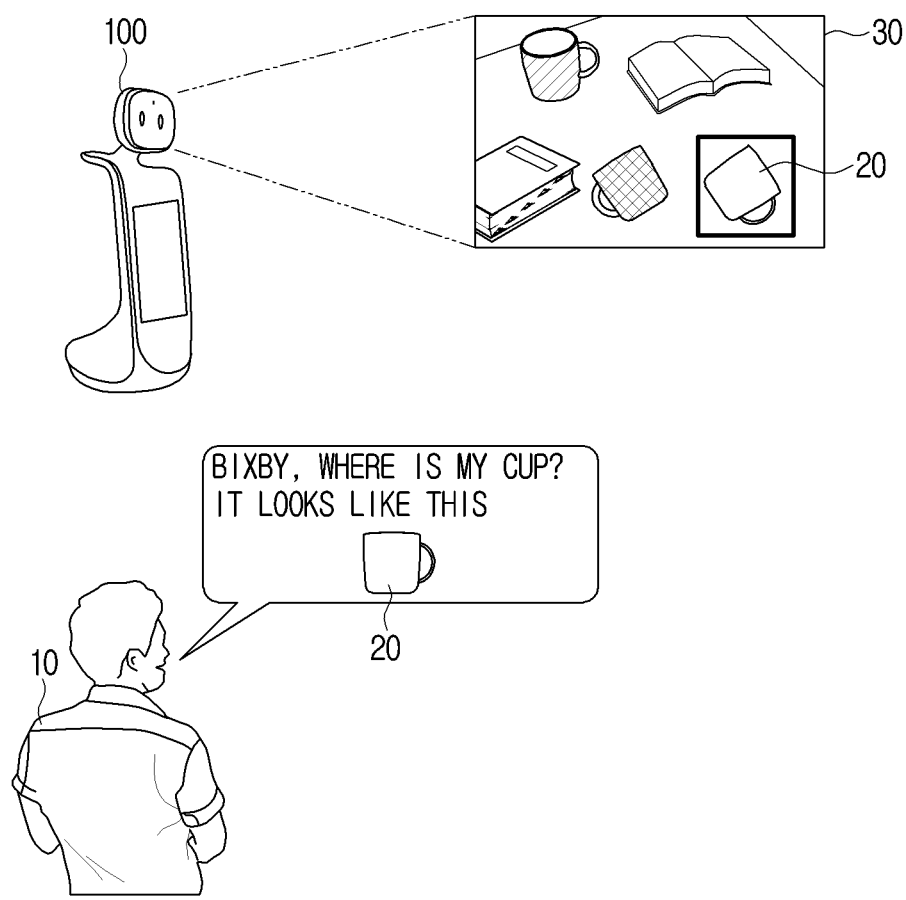
FIG. 1 is a view for explaining an electronic apparatus according to an embodiment.

Generally speaking, one or more embodiments relate to devices, methods and systems for customizing a machine learning (ML) model by enabling a user to add new classes to the machine learning model. This may enable the model to, for example, recognize objects that are specific to the user, which may improve/enhance user experience. For example, the machine learning model may be used to classify or categorize objects in images captured by a user using their user device (e.g., smartphone). This may enable a user to more readily search through images on their device to find images belonging to a particular class. In another example, the model may be customized to identify a user's version of an object the model already recognizes. For example, a user may wish for a robot butler that has an image recognition functionality to recognize the user's particular mug out of a collection of mugs. Thus, one or more embodiments enable a machine learning model that is used for recognition to be personalized and customized.

The terms "class" and "classification" are used interchangeably herein with the terms "category" and "categorization."

As mentioned above, there is a desire to enable a user to customize a machine learning model that a company has created and provided to the user. For example, a user may purchase a device such as a smartphone, virtual assistant device, or robot that can implement a machine learning model. The machine learning model may be stored on the device and implemented on the device, or may be partly implemented on the device and partly implemented elsewhere (e.g. on a cloud or remote server). The machine learning model may have been trained to perform a particular task such as image classification or object recognition. The machine learning model may have been trained using a set of samples (e.g., images), and a set of classes may have been determined. The classes may be used by a classifier to analyze new samples (e.g., images captured by a camera of a smartphone) for classification/categorization purposes. However, the original training of the machine learning model may have been performed using a specific set of samples and therefore, a specific set of classes may be created. The specific set of samples may have been chosen to be suitable for most users or the most common or general classification/categorization purposes (e.g., identifying whether an image contains a dog or a cat). The user may wish for the machine learning model to be customized/personalized so that particular classes that are specific to the user are used by the model. For example, the user may wish the model to not only be able to identify whether an image contains a dog, but also identify whether the image contains their dog. In order to enable this additional, personalized functionality, the classifier of the machine learning model needs to contain a class that describes the user's dog.

One or more embodiments enable a machine learning or AI model/algorithm to be customized in a time-efficient, resource-efficient and cost-effective manner, while also ensuring the model remains accurate. This is achieved by locally extending the classifier of the machine learning model on the user device (e.g. smartphone). In other words, global changes to the classifier that are created during the training process are not made or required—this means that the model can be updated quickly as the model does not need to be retrained from scratch. Furthermore, this means it is not necessary to use cloud computing to update/customize the model, which is expensive. The model can be updated locally, i.e., on the user's device, which means the customization process uses available resources in an efficient manner. In an embodiment, the classifier is effectively split into two portions—a base portion containing the original classes of the classifier obtained during the training process, and a local portion containing the new classes that are created specifically for a user based on samples the user inputs. When the machine learning model is run to classify/categorize samples, both the base portion and the local portion of the classifier are used. This means that the customized model still contains all the original information from when the model was originally trained and the new classes created by/for the user, thereby ensuring no loss in model accuracy or functionality. For example, the model may still be able to recognize dogs and cats in images, but it can now also recognize a user's dog.

The machine learning (ML) model include a feature extractor. Each time the ML model is run on the user device, the feature extractor is used to extract features from an input sample. The extracted features can then be used by the classifier of the ML model (i.e., the base portion and the local portion) to determine whether the features correspond to a particular class. The feature extractor may be provided on the user device. Additionally or alternatively, the feature extractor may reside in an external server/cloud server, and the processing performed by the feature extractor may therefore be performed off-device.

Thus, the operation of obtaining at least one extracted feature may include transmitting the user request and at least one sample to a server including the feature extractor and base portion of the classifier of the machine learning model, and receiving, from the server, the at least one extracted feature from the feature extractor.

Alternatively, the operation of obtaining at least one extracted feature may include applying, on the user device, the feature extractor to the at least one sample, and extracting at least one feature from the at least one sample.

The base portion of the classifier may be a matrix including a plurality of columns, where each column is a classifier weight vector corresponding to a class. The storing of the at least one extracted feature as a representation of the new class may include storing a classifier weight vector corresponding to the new class on the user device. Thus, when the customized ML model is run, a full forward pass through the whole model is performed. That is, each sample goes through the feature extractor and the obtained feature vector is compared to the classifier weight vectors of the classifier. In some cases, the feature vector may be compared to the weight vectors of the base portion of the classifier first (either in the cloud or on the device), and then compared to the weight vector(s) of the local portion of the classifier (on the device). More specifically, the classification process may include calculating the dot product between the feature vector obtained for an input sample, and each weight vector in the classifier. The model outputs a class that is most likely representative of the sample, e.g., the class for which cosine distance between the feature vector and weight vector is shortest.

The base portion (i.e., the original portion) of the classifier may be regularized using an orthogonality constraint. This may result in the base portion of the classifier (i.e., the base classifier weight vectors) being structured in a way that they are more compatible with new weight vectors that are added to the classifier (i.e., the local portion). In other words, the orthogonality constraint may be chosen to help make the model customizable and may result in better generalization performance since the base portion of the classifier is more amenable. The orthogonality constraint may make the base classifier weight vectors more distant (in terms of a cosine distance) from each other. Optionally, the method of customizing the model may include regularizing the classifier weight vector corresponding to the new class, using the same orthogonality constraint. However, it may not be necessary to regularize the local portion of the classifier because of the relative size of the local portion compared with the base portion. In other words, regularizing the base portion (which may contain hundreds of classes) may lead to efficiencies in matching a class to a new input sample, but regularizing the local portion (which may only contain a few additional classes) may make negligible improvements to the processing. Nevertheless, regularizing the weight vectors of the local portion of the classifier may be performed on the device as a relatively cheap, fine-tuning step.

A user may make a request for a new class in a number of ways. These are described below in more detail with reference to the figures. For instance, the user request may include one or more samples (e.g., an image of the user's dog) representative of the new class, and/or may include at least one keyword (e.g. "my dog") to be associated with the new class, and/or may include one or more samples and one or more keywords. The customization method may vary depending on the contents of the user request. The customization method may include determining if the new class requested by the user is actually new, or if it is closely matched/very similar to an existing class in the classifier (either in the base portion, or in the local portion if this already exists). In the latter case, the method may include suggesting to the user that a similar or substantially identical class already exists. The user may accept the suggestion to, for example, link their keyword(s) to the existing class. Alternatively, the user may reject the suggestion and the method may continue the process to add the user's proposed class to the model.

As will be appreciated by one skilled in the art, embodiments may be embodied as a system, method or computer program product. Accordingly, present techniques may take the form of an entirely hardware embodiment, an entirely software embodiment, or an embodiment combining software and hardware aspects.

Furthermore, embodiments may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of embodiments may be written in any combination of one or more programming languages, including object oriented programming languages and conventional procedural programming languages. Code components may be embodied as procedures, methods or the like, and may comprise subcomponents which may take the form of instructions or sequences of instructions at any of the levels of abstraction, from the direct machine instructions of a native instruction set to high level compiled or interpreted language constructs.

Embodiments also provide a non-transitory data carrier carrying code which, when implemented on a processor, causes the processor to carry out any of the methods described herein.

Embodiments further provide processor control code to implement the described methods, for example on a general purpose computer system or on a digital signal processor (DSP). Embodiments also provide a carrier carrying processor control code to, when running, implement any of the above methods, in particular on a non-transitory data carrier. The code may be provided on a carrier such as a disk, a microprocessor, CD- or DVDROM, programmed memory such as non-volatile memory (e.g. Flash) or read-only memory (firmware), or on a data carrier such as an optical or electrical signal carrier. Code (and/or data) to implement embodiments described herein may include source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments may suitably be embodied in a logic apparatus comprising logic elements to perform the steps of disclosed methods, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

FIG. 1 is a view for explaining an electronic apparatus 100 according to an embodiment. An electronic apparatus 100 may obtain an image 30 by capturing the surrounding environment. For example, the electronic apparatus 100 may be a robot. The electronic apparatus 100 may recognize an object included in the obtained image 30. Specifically, the electronic apparatus 100 may recognize the object included in the image 30 by inputting the obtained image 30 to a neural network model trained to recognize an object included in an image. For example, the electronic apparatus 100 may recognize a cup included in the image 30.

The electronic apparatus 100 may obtain a command, from the user 10, to find a cup 20 of a user 10. In order for the electronic apparatus 100 to recognize the cup 20 of the user 10, the electronic apparatus 100 uses a neural network model trained to recognize the cup 20 of the user 10. However, the electronic apparatus 100 generally distributed to the user 10 uses a neural network model suitably trained for universal and general purposes (for example, recognizing and identifying that an object is a cup or a book). Accordingly, although the electronic apparatus 100 may recognize a plurality of cups included in the image 30 by using a related art object recognition model (or neural network mode), the electronic apparatus 100 may not recognize the cup 20 specifically of the user 10 among the plurality of cups.

When a command related to the cup 20 of the user 10 that is an object not recognizable by a neural network model stored in advance (e.g., command to find the cup 20) is obtained from the user 10, the electronic apparatus 100 according to an embodiment may extract features of the cup 20 and obtain a new (or update a) neural network model by changing a weight vector value of the neural network model stored in advance based on the extracted features. Then, the electronic apparatus 100 may execute a function corresponding to the user command (e.g., a function of providing a location of the cup 20 to the user) by using the obtained new neural network model.

Hereinafter, a method for controlling the electronic apparatus 100 for executing such a function is described.

Figure 2:
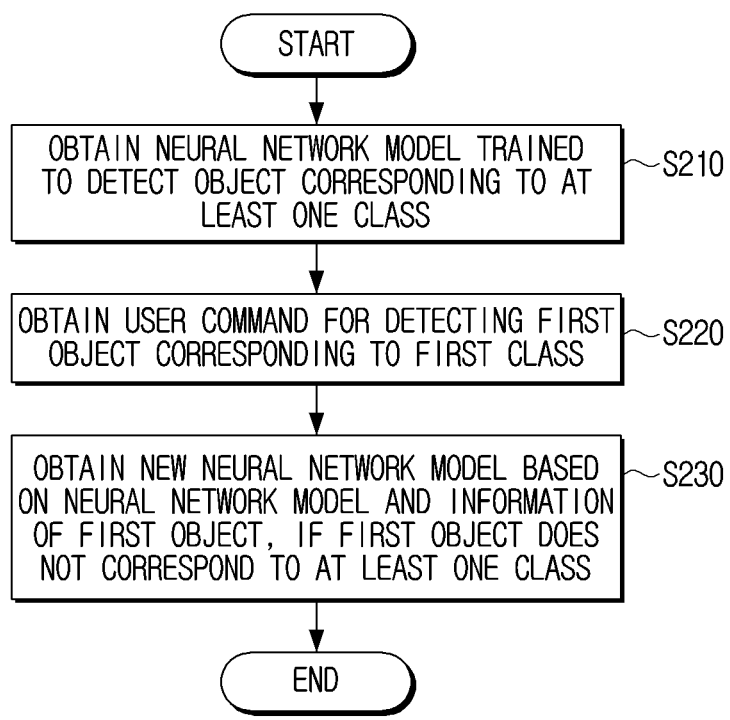
FIG. 2 is a flowchart showing a method for controlling an electronic apparatus according to an embodiment.

FIG. 2 is a flowchart showing a method for controlling the electronic apparatus 100 according to an embodiment.

Referring to FIG. 2, the electronic apparatus 100 may obtain a neural network model trained to detect an object corresponding to at least one class (operation S210). The electronic apparatus 100 may obtain the trained neural network model from an external server or an external apparatus. The electronic apparatus 100 may detect an object corresponding to the at least one class by using the obtained neural network model. For example, the electronic apparatus 100 may obtain an image by capturing an environment and obtain type information and location information of an object included in the image by inputting the obtained image to the neural network model. The term "class" is a term for classifying a plurality of objects and may be interchangeably used with "classification" and "category."

The neural network model may include a feature extraction module (or feature extractor) that extracts a feature value (or feature) of an object and a classification value obtaining module (or classifier) that obtains a classification value of the object based on the feature value obtained from the feature extraction module. The classification value obtaining module may include weight vectors including at least one column vector.

The neural network model may be trained by various learning methods. Particularly, the neural network model may be trained based on a machine learning method. The neural network model may be trained based on a loss function including a predefined regularizing function to prevent overfitting. Particularly, the neural network model may be trained based on orthogonal constraint.

The electronic apparatus 100 may obtain a user command for detecting a first object corresponding to a first class (operation S220). The user command may be formed or provided in various forms. For example, the user command may include a command for storing the first class in the electronic apparatus 100 as a new class or a command for detecting the first object corresponding to the first class. In addition, the electronic apparatus 100 may obtain an image of the first object.

When (or based on) a user command is obtained, the electronic apparatus 100 may determine whether or not the first object corresponds to the at least one class learned in advance and recognizable by the neural network model. Specifically, the electronic apparatus 100 may obtain an image of the first object and obtain a first feature value of the first object by inputting the image of the first object to the neural network model. The electronic apparatus 100 may determine whether or not the first object corresponds to the at least one class learned in advance, by comparing the first feature value and the weight vector of the trained neural network model.

If the first object does not correspond to the at least one class, the electronic apparatus 100 may obtain a new neural network model based on the neural network model and information of the first object (operation S230), and the electronic apparatus 100 may detect the first object by using the obtained new neural network model. The electronic apparatus 100 may obtain the new neural network model based on few-shot learning. The few-shot learning refers to learning performed using a smaller amount of learning data than that in general learning. Hereinafter, the neural network model refers to the neural network model obtained in operation S210 and the neural network model obtained in operation 230 refers to the new (or updated) neural network model, unless otherwise noted.

The electronic apparatus 100 may obtain the first feature value of the first object by inputting the image of the first object to the feature extraction module of the neural network model. Then, the electronic apparatus 100 may obtain a new classification value obtaining module based on the first feature value and the classification value obtaining module of the neural network model. For example, the electronic apparatus 100 may generate a first column vector based on an average value of the first feature value and obtain a new classification value obtaining module by adding the first column vector as a new column vector of a weight vector. In addition, the electronic apparatus 100 may regularize the new classification value obtaining module based on a predefined regularizing function.

Hereinafter, a method for training the neural network model and a method for obtaining a new neural network model based on the trained neural network model are described in more detail.

Figure 3A:
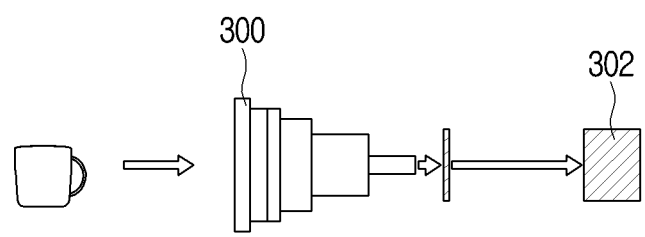
FIG. 3A is a view for explaining a related art object recognition model using few-shot learning.

FIG. 3A is a view for explaining a related art object recognition model using few-shot learning. When a new class is added to the related art object recognition model trained in advance, the object recognition model is able to detect only an object corresponding to the new class and cannot detect an object corresponding to the class learned in advance before the new class is added. That is, a classifier 302 of the related art object recognition model only includes a weight vector of the new class and does not include a weight vector of the original class. In addition, in order to recognize the object corresponding to the new class, it is necessary to perform a process of training the classifier 302 based on learning data corresponding to the new class.

Figure 3B:
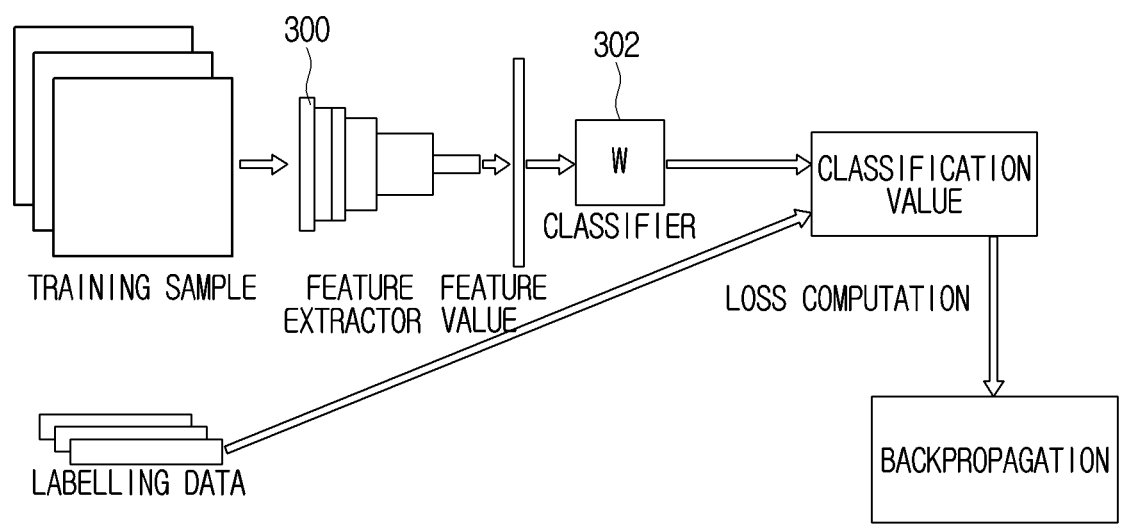
FIG. 3B is a view for explaining a method for training the related art object recognition model.

FIG. 3B is a view for explaining a method for training the related art object recognition model. Referring to FIG. 3B, the related art object recognition model includes a feature extractor 300 and a classifier 302. The feature extractor 300 extracts features of a training sample to be input and the classifier 302 outputs a classification value of the extracted features. The classifier 302 includes a weight vector W. The related art object recognition model is trained by backpropagation for minimizing errors calculated based on a loss function defined based on the output classification value and labelling data corresponding to the training sample.

Figure 4A:
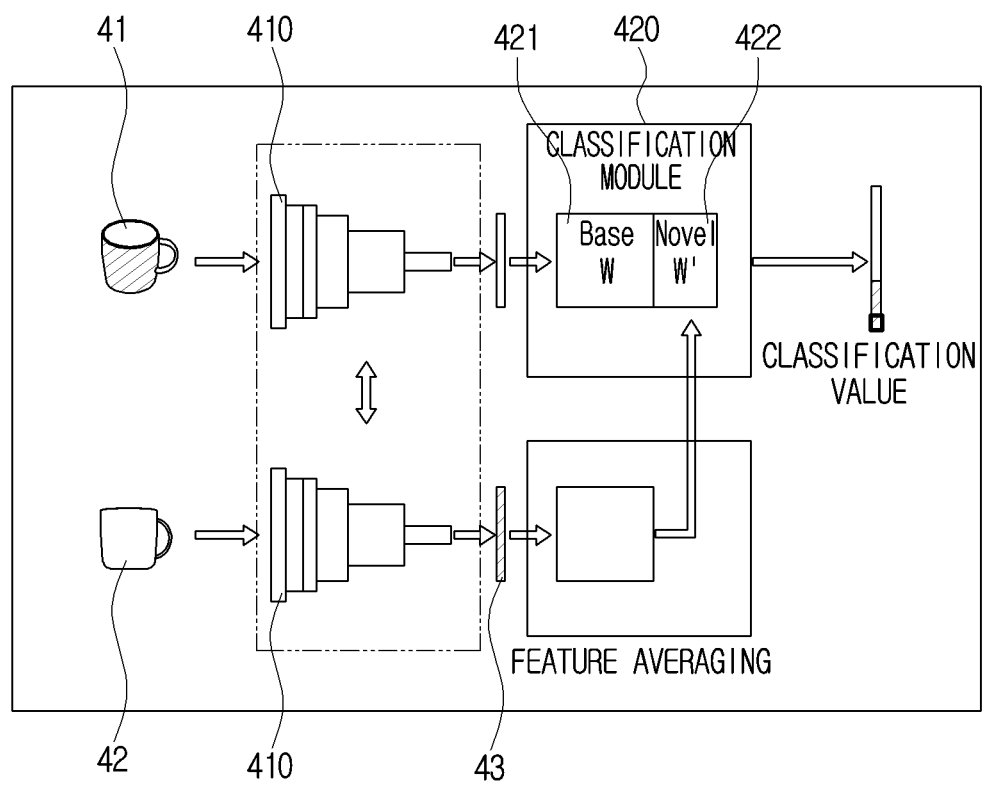
FIG. 4A is a view for explaining a method for obtaining a new neural network model according to an embodiment.

FIG. 4A is a view for explaining a method for obtaining a new neural network model according to an embodiment. The electronic apparatus 100 may train the neural network model based on the few-shot learning. Referring to FIG. 4A, the neural network model may include a feature extraction module 410 and a classification module (or classification value obtaining module) 420. The classification module 420 may include a weight vector consisting of a plurality of column vectors or row vectors. Each column vector of the weight vector may correspond to each class. The classification module 420 may include a base portion 421 and a novel portion 422. The base portion 421 may include a vector corresponding to a class learned in advance, and the novel portion 422 may include a vector corresponding to the new class according to a user input. The novel portion 422 may be interchangeably used with a local portion.

The electronic apparatus 100 may obtain a feature value of an object 41 by inputting the object 41 corresponding to the class learned in advance (that is, included in the base portion) to the feature extraction module 410. The electronic apparatus 100 may obtain a classification value of the object 41 by inputting the obtained feature value to the classification module 420. The electronic apparatus 100 may execute dot product calculation between the feature value of the object 41 and the weight vector included in the classification module 420. In addition, the neural network model may output the classification value based on a cosine distance between a vector of the feature value and the weight vector of the classification module 420.

The electronic apparatus 100 may receive a request for a first object 42 not corresponding to the class learned in advance (that is, not included in the base portion 421) from a user. The electronic apparatus 100 may obtain a first feature value 43 by inputting the first object 42 to the feature extraction module 410. The electronic apparatus 100 may obtain a new weight vector (or column vector) to be assigned or stored in the novel portion 422 based on the first feature value 43. For example, the electronic apparatus 100 may average the first feature value 43 and store the averaged first feature value 43 in the novel portion 422. Accordingly, the novel portion 422 may include a weight vector corresponding to a new class corresponding to the first object 42. As described above, the electronic apparatus 100 may obtain the new neural network model by updating the novel portion 422 of the classification module 420 based on the first feature value 43.

Referring to FIG. 3A again, when the related art neural network model (or electronic apparatus applied with the related art neural network model) is trained to recognize the object corresponding to the new class, the neural network model does not include the weight vector corresponding to the class learned in advance according to the updating of the classifier 302 to include the weight vector corresponding to the new class. Therefore, the related art neural network model is not able to recognize the object corresponding to the class learned in advance. In contrast, the new neural network model according to an embodiment includes both the base portion 421 and the novel portion 422, although the new neural network model is trained to recognize the object corresponding to the new class. Therefore, the electronic apparatus 100 may recognize not only the first object 42 but also the object 41 learned in advance, by using the new neural network model.

Figure 4B:
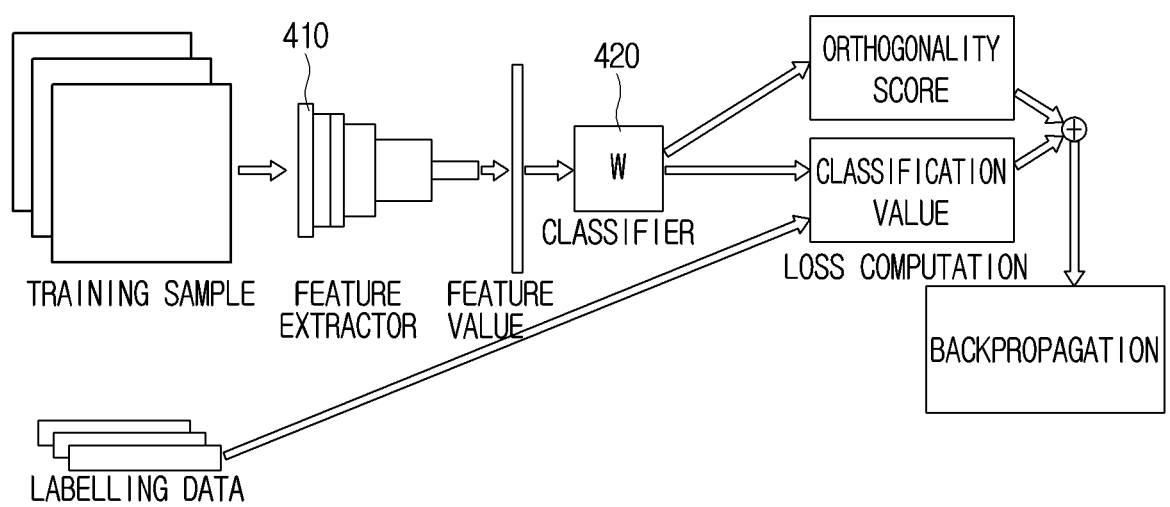
FIG. 4B is a view for explaining a method for training a neural network model according to an embodiment.

FIG. 4B is a view for explaining a method for training a neural network model according to an embodiment.

Referring to FIG. 4B, the neural network model may include the feature extraction module 410 and the classification value obtaining module 420. The feature extraction module 410 is trained to extract a feature (or feature value) of a training sample to be input. The classification value obtaining module 420 is trained to output the classification value of the training sample based on the feature value output from the feature extraction module 410. The neural network model may be trained based on a loss function defined based on an orthogonality score calculated by a predefined function, the classification value, and the labelling data corresponding to the training sample. The neural network model may be trained according to backpropagation for minimizing the error calculated based on the loss function. The orthogonality score herein may be a regularized value of the weight vector of the classification value obtaining module 420.

The related art object recognition model according to FIG. 3B is not trained based on the orthogonality score, and accordingly, the normalization with respect to the classifier 302 is not executed. Thus, the related art object recognition model is not able to recognize the object of the new class due to the overfitting of the class learned in advance. In contrast, the neural network model according to an embodiment is not overfit with respect to the specific class due to the regularization based on the orthogonality score. In addition, compatibility between the weight vectors included in the base portion 421 and the weight vectors added to the novel portion 422 may be improved. That is, if the neural network model is trained based on an orthogonality constraint, a user may more easily customize the neural network model. In addition, the electronic apparatus 100 may perform regularization of the weight vectors added to the novel portion 422 based on the orthogonality constraint.

Figure 5A:
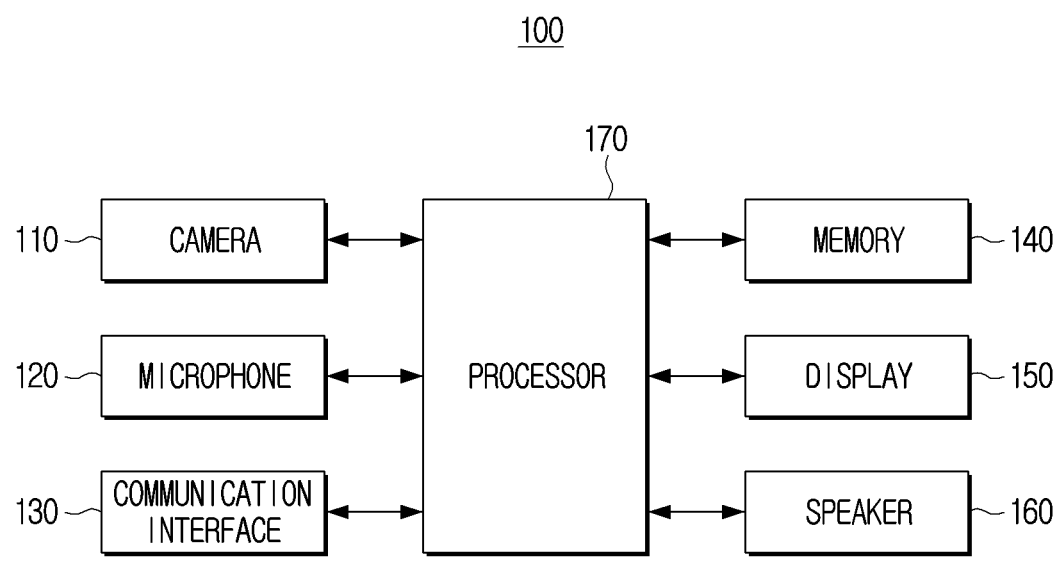
FIG. 5A is a block diagram showing a configuration of the electronic apparatus according to an embodiment.

FIG. 5A is a block diagram showing a configuration of an electronic apparatus 100 according to an embodiment.

Referring to FIG. 5A, the electronic apparatus 100 may include a camera 110, a microphone 120, a communication interface 130, a memory 140, a display 150, a speaker 160, and a processor 170. For example, the electronic apparatus 100 may be any user device, such as, but not limited to, a smartphone, tablet, laptop, computer or computing device, virtual assistant device, robot or robotic device, consumer good/appliance (e.g., a smart fridge), an internet of things device, an image capture system/device, etc. Hereinafter, each component will be described.

The camera 110 may obtain an image by capturing an environment of the electronic apparatus 100. In addition, the camera 110 may obtain a user command. For example, the electronic apparatus 100 may obtain an image of an object provided by a user or an image obtained by capturing a gesture of a user. The camera 110 may be implemented as various types of cameras. For example, the camera 110 may be any one of a two dimensional (2D)-based RGB camera or an infrared (IR) camera. In addition, the camera 110 may be any one of a three-dimensional (3D)-based time-of-flight (ToF) camera and a stereo camera.

The microphone 120 may be provided in the electronic apparatus 100 as a component for receiving a voice of a user, but this is merely an example. According to another embodiment, the microphone 120 may be connected to the electronic apparatus 100 from outside of the electronic apparatus 100 in a wired or wireless manner. The microphone 120 may receive a user voice (e.g., user voice input or user voice command) for searching for a specific object.

The communication interface 130 (e.g., at least one communication interface) may include at least one circuitry and perform communication with various types of external devices. For example, the communication interface 130 may perform communication with an external server or a user terminal. In addition, the communication interface 130 may perform communication with an external device according to various types of communication systems. The communication interface 130 may perform data communication in a wireless or wired manner. When performing communication with an external device by a wireless communication system, the communication interface 130 may include at least one of a wireless communication module, a cellular communication module, a 3rd Generation (3G) mobile communication module, a 4th generation (4G) long term evolution (LTE) communication module, and a 5th generation (5G) mobile communication module. According to an embodiment, the communication interface 130 may be implemented as a wireless communication module, but this is merely an example, and the communication interface 130 may be implemented as a wired communication module (e.g., LAN) in another embodiment.

The memory 140 (e.g., at least one memory) may store an operating system (OS) for controlling general operations of components of the electronic apparatus 100 and instructions or data related to the elements of the electronic apparatus 100. The memory 140 may be implemented as a non-volatile memory (e.g., hard disk, solid state drive, or flash memory), and/or a volatile memory.

For example, the memory 140 may store an instruction that, when executed, enables the processor 170 to obtain type information or location information of an object included in an image, when the image is obtained from the camera 110. In addition, the memory 140 may store a neural network model for recognizing the object. The neural network model may be executed by a general-purpose processor (e.g., CPU) or a separate AI dedicated processor (e.g., graphics processing unit (GPU) or neural processing unit (NPU)). In addition, the memory 140 may store data of an application with which a user may request to add the new class to the neural network model.

The display 150 may display various screens. For example, the display 150 may display a screen via which a user may input a request for the new class by using an application by displaying an application execution screen. In addition, the display 150 may display an object requested by a user or display a prompt or an alert generated by the electronic apparatus 100. The display 150 may be implemented as a touch screen. In this case, the processor 170 may obtain a touch input of a user via the display 150.

The speaker 160 may be a component outputting not only various pieces of received audio data, but also various alerts or voice messages to outside. The electronic apparatus 100 may include an audio output device such as the speaker 160 or may include an output device such as an audio output terminal. The speaker 160 may provide a response result or an action result of the user's voice in a form of sound.

The processor 170 (e.g., at least one processor) may control general operations of the electronic apparatus 100. For example, the processer 170 may obtain a neural network model trained to detect an object corresponding to at least one predetermined class. The obtained neural network model may be a neural network model trained to obtain type information of an object included in an image. The neural network model may include a feature extraction module that extracts a feature value of an object, and a classification value obtaining module that obtains a classification value of an object based on the feature value obtained from the feature extraction module.

The processor 170 may obtain a user command for detecting a first object corresponding to a first class. The processor 170 may obtain a first feature value of the first object by inputting an image of the first object to the trained neural network model, and may determine whether or not the first object corresponds to at least one class by comparing the first feature value and the weight vector of the trained neural network model.

When (or based on) the first object does not correspond to the at least one class, the processor 170 may obtain a new neural network model based on the neural network model and information of the first object. Specifically, the processor 170 may obtain the image of the first object and obtain the first feature value of the first object by inputting the obtained image of the first object to the feature extraction module. Then, the processor 170 may obtain a new classification value obtaining module based on the first feature value and the classification value obtaining module. The classification value obtaining module may include a weight vector including a plurality of column vectors. The processor 170 may generate a first column vector based on an average value of the first feature value and may obtain a new classification value obtaining module by adding the first column vector as a new column vector of the weight vector. The processor 170 may regularize the obtained new classification value obtaining module based on the predefined regularizing function.

The processor 170 may customize a neural network model. The processor 170 may receive a user request for a new class and determine whether or not the new class is new and should be added to the neural network model. When the new class is determined to be new, the processor 170 may obtain at least one sample representing the new class. The processor 170 may obtain at least one of an image, an audio file, an audio clip, a video, and a frame of a video.

The processor 170 may obtain at least one feature extracted from at least one sample from a neural network model including the feature extraction module and a base portion of the classification value obtaining module. The processor 170 may transmit the user request and the at least one sample to an external server including the neural network model via the communication interface 130. The processor 170 may receive a feature of the at least one sample from an external server. The processor 170 may store the extracted at least one feature as a representative of the new class. The processor 170 may store a weight vector of the classification value obtaining module corresponding to the new class in the memory 140.

The processor 170 may obtain at least one keyword related to the new class. The processor 170 may determine whether or not the at least one keyword matches or corresponds to one of a plurality of predefined keywords in the base portion of the classification value obtaining module of the neural network model. When the at least one keyword matches or corresponds to one of the plurality of predefined keywords, the processor 170 may identify a class corresponding to the matched predefined keyword. The processor 170 may control the display 150 and/or the speaker 160 to output an example sample corresponding to the identified class and a suggestion to assign the at least one keyword to the identified class. When user confirmation that the at least one keyword is to be assigned to the identified class is obtained, the processor 170 may assign the at least one keyword to the identified class. In contrast, when no such user confirmation is obtained or when a user input disapproving of the at least one keyword is assigned to the identified class, the processor 170 may add the new class to the neural network model.

The electronic apparatus 100 according to an embodiment may be advantageous from a user privacy perspective. This is because the new class is stored on the electronic apparatus 100, rather than being stored in the cloud or added to the base portion of the classifier that other users can use/access. However, it may be desirable for the new class defined by the user to be shared across the user's other apparatuses (e.g., from a smartphone to their laptop, virtual assistant, robot butler, smart fridge, etc.). Thus, the processor 170 may share the new class stored in the local portion of the classification value obtaining module with an external apparatus. The processor 170 may share the new class stored in the local portion of the classification value obtaining module with an external server including the base portion of the classification value obtaining module. This may happen automatically or in response to a user input. For example, if the neural network model is used as part of a camera application, when the model is updated on a user's smartphone, the neural network model may automatically be shared with any of the user's other devices running the same camera application. Thus, the sharing may form part of a software application synchronization across multiple devices.

The operations related to the artificial intelligence according to an embodiment are operated by the processor 170 and the memory 140. The processor 170 may be configured with one or a plurality of processors. The one or the plurality of processors may be a general-purpose processor such as a CPU, an application processor (AP), a digital signal processor (DSP), a graphic dedicated processor such as a GPU or a vision processing unit (VPU), or an artificial intelligence dedicated processor such as an NPU. The one or the plurality of processors perform control to process input data according to predefined action rule stored in the memory 140 or artificial intelligence model. In addition, if the one or the plurality of processors are artificial intelligence dedicated processors, the artificial intelligence dedicated processors may be designed to have a hardware structure specialized in processing of a specific artificial intelligence model.

The predefined action rule or the artificial intelligence model is formed through training. The forming through training refers to forming a predefined action rule or an artificial intelligence model having a desired feature by applying a training algorithm to a plurality of pieces of training data. Such training may be performed in a device demonstrating artificial intelligence according to an embodiment or performed by a separate server or system. Examples of the learning algorithm include a supervised learning, unsupervised learning, semi-supervised learning, generative adversarial network or reinforcement learning, etc., but is not limited thereto.

The artificial intelligence model may be constituted with a plurality of neural network layers. The plurality of neural network layers have a plurality of weight values, respectively, and execute neural network processing through a processing result of a previous layer and processing between the plurality of weights. The plurality of weights of the plurality of neural network layers may be optimized by the training result of the artificial intelligence model. For example, the plurality of weights may be updated to reduce or to minimize a loss value or a cost value obtained by the artificial intelligence model during the training process. The artificial neural network may include a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, etc., but is not limited thereto.

The electronic apparatus 100 according to an embodiment may customize the neural network model in a time-efficient, resource-efficient and cost-effective manner, while also ensuring the neural network model remains accurate. This is achieved by locally extending the classification value obtaining module of the neural network model on the electronic apparatus 100. In other words, global changes to the pre-trained classification value obtaining module are not made by the electronic apparatus 100. This means that the neural network model can be updated quickly as the model does not need to be retrained from scratch. Furthermore, this means it is not necessary to use cloud computing to update/customize the model, which is expensive and time consuming.

The electronic apparatus 100 may obtain the neural network model from an external server.

Figure 5B:
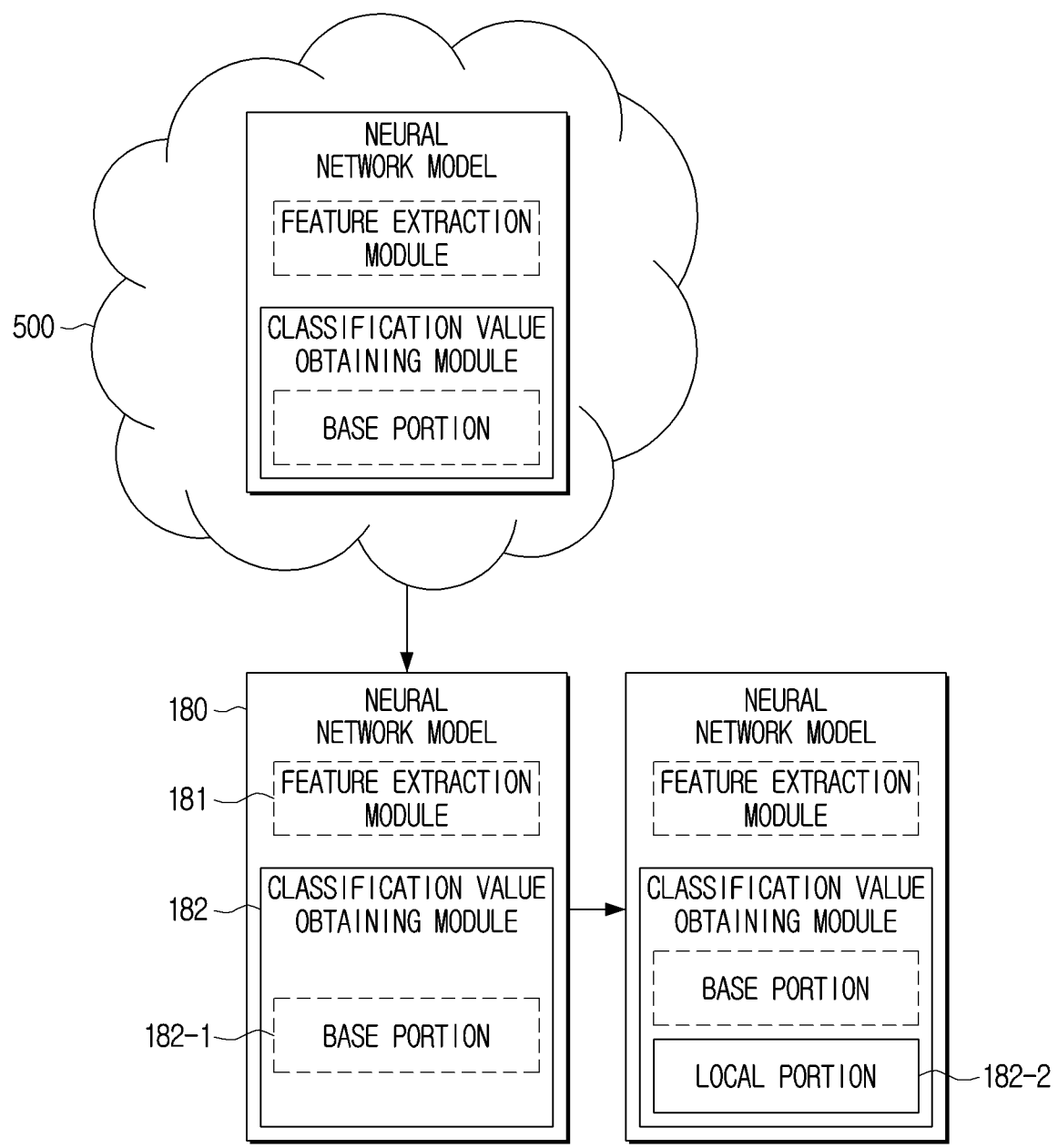
FIG. 5B is a view for explaining a method for obtaining a new neural network model according to an embodiment.

FIG. 5B is a view for explaining a method for obtaining a new neural network model according to an embodiment. Referring to FIG. 5B, the electronic apparatus 100 may obtain a neural network model 180 including a feature extraction module 181 and a classification value obtaining module 182 from an external server 500. The classification value obtaining module 182 may include a base portion 182-1. The electronic apparatus 100 may obtain a new classification value obtaining module from the classification value obtaining module 182 obtained from the external server 500. Specifically, the electronic apparatus 100 may average a feature value of an object corresponding to a new class and store the average feature value in the local portion 182-2. Accordingly, the electronic apparatus 100 may extract the objet corresponding to the new class. The operation of obtaining the feature value of the object corresponding to the new class may be executed by the external server 500. In such a case, the electronic apparatus 100 may obtain information of the object corresponding to the new class from the user, transmit the information to the external server 500, and receive the information of the object corresponding to the new class extracted by the external server 500.

A user may make a request for a new class in a number of ways. For instance, the user request may include one or more samples (e.g., an image of the user's dog) representative of the new class, and/or may include at least one keyword (e.g., "my dog") to be associated with the new class, and/or may include one or more samples and one or more keywords. The customization method may vary depending on the contents of the user request.

FIG. 6A illustrates a technique for customizing a machine learning model using samples that are images. In this example, a user may wish to find pictures of his dog on his smartphone. However, as a dog lover, the user may have thousands of pictures of other dogs on his device. An image gallery application on a smartphone may be able to locate all pictures containing dogs using text-based keyword searching, but may not be able to locate pictures containing the user's dog because no keyword or class corresponds to the user's dog.

Referring to FIG. 6A, in operation S600, the user may launch the image gallery application on their smartphone and enter the settings section of the application. In the settings section, the user may be able to "add a new search category." Thus, the process for customizing the machine learning model may be built-into the application. The application may prompt the user to enter a request for a new class. The application may prompt the user to enter new category keywords. In this case, at operation S602 the user may enter the keywords "German shepherd," "my dog," and "Laika" (the dog's name) to be associated with the new category. At operation S604, the user may add pictures of his dog into the application, either by capturing an image of the dog using his camera or via selection from the image gallery. This new category may now be saved. When the user subsequently enters keywords "my dog" into the search function of the image gallery application, the user is provided with images of his dog (operation S606).

A user may also use the settings section of the image gallery application to remove categories he no longer requires, by removing the keywords associated with the categories. This may cause the classifier weight vectors associated with those keywords to be removed from the local portion of the classifier.

Figure 6B:
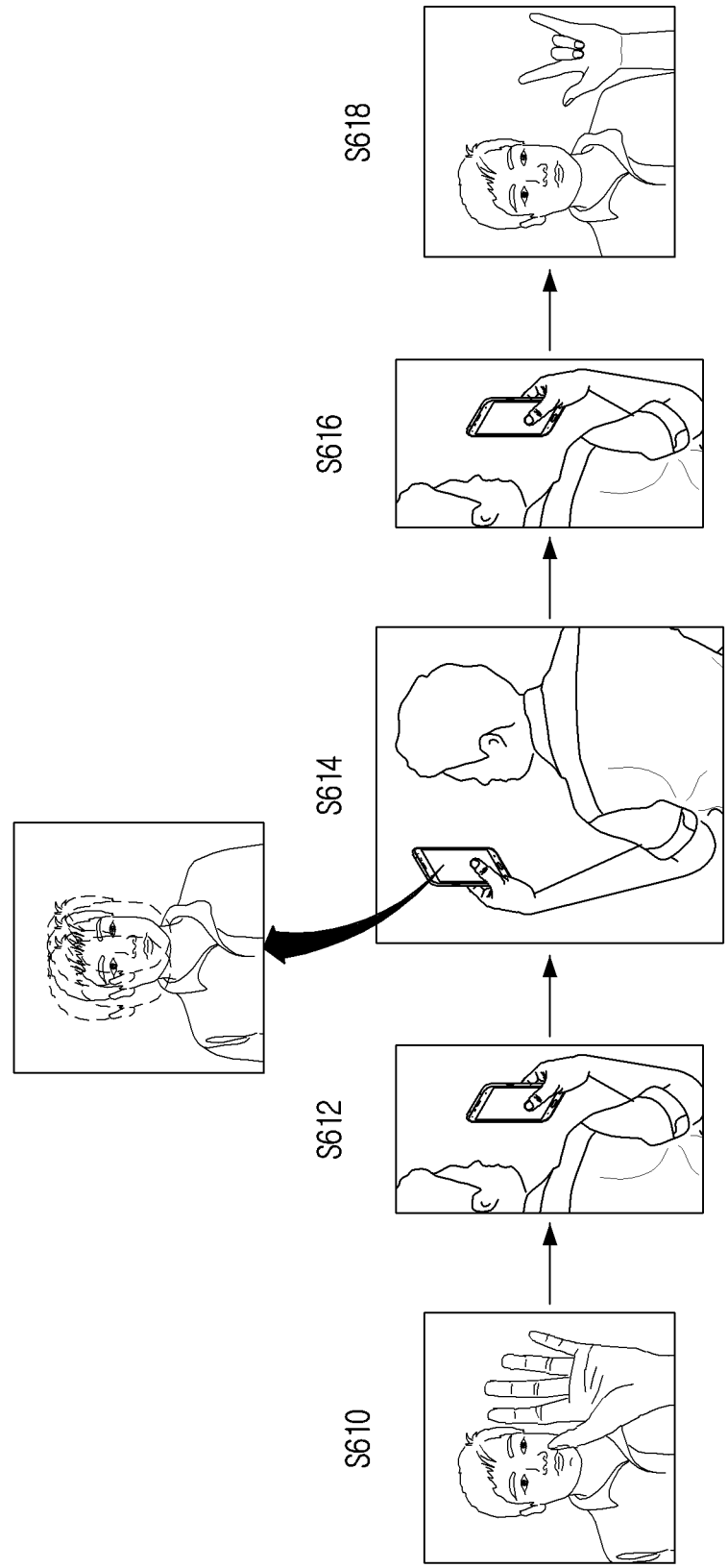
FIG. 6B is a view showing a method for customizing a neural network model using samples that are frames of a video according to an embodiment.

FIG. 6B illustrates a technique for customizing a machine learning model using samples that are frames of a video. In this example, a user may not like the default open hand gesture that is used by his smartphone to give a command to the camera of the smartphone to take a selfie (as shown in operation S610). The user wants to register a new gesture for the "take a selfie" command. At operation S612, the user enters the camera settings section and selects "set new selfie-taking gesture." The user begins recording a user-defined gesture, which may be a left-to-right head motion (operation S614). At operation S616, the user may confirm his choice. The user can now use his new gesture to activate the selfie-taking action (operation S618).

As mentioned above, it may be desirable to only register a new class in the local portion of the classifier of the machine learning model if the base portion of the classifier (or the local portion if this already exists), does not already contain the same or substantially identical class. If a similar or substantially identical class already exists in the classifier, the device may inform the user that the class exists and propose linking their keywords with the existing class. The user may accept the suggestion or may reject the suggestion, in which case the process to add the user's proposed class to the model may continue.

Figure 7:
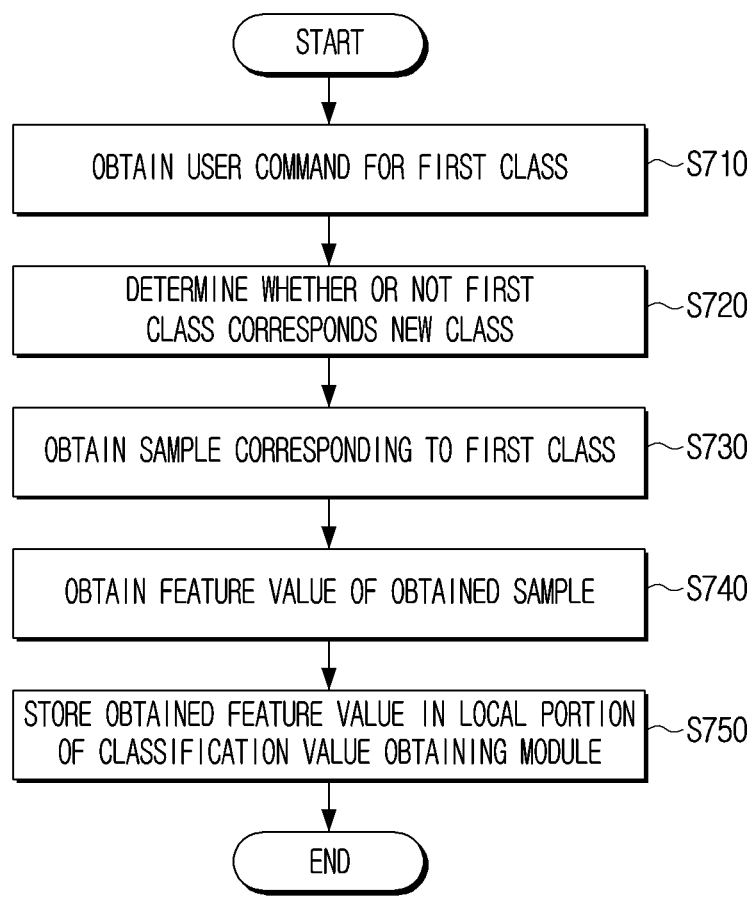
FIG. 7 is a flowchart showing a method for controlling the electronic apparatus according to an embodiment.

FIG. 7 is a flowchart showing a method for controlling the electronic apparatus 100 according to an embodiment.

Referring to FIG. 7, the electronic apparatus 100 may obtain a user command for the first class (operation S710). The user may make this request in any suitable way, such as by launching an application on the device which enables the user to interact with the neural network model. The application may be an application associated with a camera on the electronic apparatus 100 or an application used to collate images and videos captured by the camera, for example.

The electronic apparatus 100 may determine whether or not the first class is a new class and should be added to the neural network model stored in the electronic apparatus 100 in advance (operation S720). This check may be performed in order to avoid duplication of classes in the model, which could make the model inefficient to run. An example of a method for determining if the first class requested by the user is a new class is described below with reference to FIG. 8.

If at operation S720 the first class is determined to be new, the electronic apparatus 100 may obtain at least one sample representative of the first class (operation S730). The at least one sample may be one or more of an image, an audio file, an audio clip, a video, and a frame of a video. Typically, the at least one sample may be a set of images which all show the same object (or features) that is to be used to define the first class. For example, if the user wishes the neural network model to identify the user's dog in images and videos, the user may provide one or more photos of the user's dog as the input samples that are representative of the first class. Where multiple samples are obtained, the samples may be all the same type/file type (e.g., images) or could be of different types (e.g., images and videos). In other words, the user could provide both photos and videos of the user's dog as the input samples.

A single sample that is representative of the first class may be sufficient to customize the neural network model. However, as with all machine learning techniques, more samples usually result in improved or better outcomes. The electronic apparatus 100 may output a message requesting a user to input more samples if the samples obtained are not of a good enough quality or are not sufficient to enable the first class to be defined and added to the neural network model.

In some cases, the user request at operation S710 may include the sample representative of the new class (that is, first class). In this case, at operation S703 the electronic apparatus 100 may simply use the sample already received. In some cases, the user request at operation S710 may not include any samples. In this case, at operation S730, the electronic apparatus 100 may include a guide message prompting the user to provide/input the sample. Alternatively, the sample may have been received at operation S720, and therefore at operation S730, the electronic apparatus 100 may use the sample obtained at operation S720.

The electronic apparatus 100 may obtain a feature value of the obtained sample (operation S740). The electronic apparatus 100 may obtain a feature value of the sample by inputting the obtained sample to the feature extraction module included in the neural network model. The entirety or a part of the neural network model may be implemented in the electronic apparatus 100 or a remote server/cloud server.

The electronic apparatus 100 may store the obtained feature value in the local portion of the classification value obtaining module (operation S750). By doing so, the electronic apparatus 100 may obtain the neural network model that is able to recognize the object corresponding to the first class.

FIG. 8 illustrates a flowchart of example steps to check whether a user-requested class already exists in a machine learning model, according to an embodiment.

Referring to FIG. 8, the process begins by receiving a user request for a new class (operation S800). This may include receiving at least one keyword to be associated with the new class (operation S802).

The process may include determining whether the at least one keyword matches one of a plurality of predefined keywords in the classifier of the machine learning model (operation S804). If a local portion of the classifier already exists, the process may include matching the keywords associated with the base portion and local portion of the classifier.

If the keyword(s) match any predefined keyword, the process may include identifying a class corresponding to the matched predefined keyword (operation S806). The process may include outputting a suggestion to the user (via the user interface of the electronic apparatus) to assign the at least one keyword to the identified existing class (operation S808). The process may also output example samples corresponding to the identified class, to help the user to understand why the requested new class is similar/identical to the identified existing class. At operation S810, the process may include awaiting a user response to the proposal/suggestion. In some cases, the process may include determining if the user has approved the suggestion. If the user approves the suggestion, the process may include receiving user confirmation that the at least one keyword is to be assigned to the identified class, and in response to the user confirmation, assigning the at least one keyword to the identified class (operation S812). Alternatively, the process may include receiving a user input disapproving of the at least one keyword being assigned to the identified class (at operation S810), and in response to the user input disapproving the at least one keyword, performing the operations to add the new class to the machine learning model (operation S814). For example, the process may continue to operation S730 of FIG. 7.

If at operation S804 the keyword(s) entered by the user does not match any of the plurality of predefined keywords, the process may include receiving at least one sample representative of the new class (operation S816). The process may then extract features from the at least one received sample (using a feature extractor on the electronic apparatus 100 or a server), and determine whether the features match an existing class in the classifier (operation S818). This may be determined by calculating the dot product between the feature vector generated using the extracted features from the received sample and each classifier weight vector of the classifier, as described above. If it is determined at operation S818 that the extracted features match an existing class, then the process outputs a suggestion to assign the received keyword to the identified class (operation S808). The process may also output example samples corresponding to the identified class, to help the user to understand why the requested new class is similar/identical to the identified existing class. At operation S810, the process may include awaiting a user response to the proposal/suggestion. In some cases, the process may include determining if the user has approved the suggestion. If the user approves the suggestion, the process may include receiving user confirmation that the at least one keyword is to be assigned to the identified class and assigning the at least one keyword to the identified class accordingly (operation S812). Alternatively, the process may include receiving user input disapproving of the at least one keyword being assigned to the identified class (at operation S810) and performing the operations to add the new class to the machine learning model accordingly (operation S814). For example, the process may continue to operation S730 of FIG. 7. Similarly, if at operation S818 it is determined that the extracted features do not match an existing class, the process proceeds to operation S814 (i.e., may continue to operation S730 of FIG. 7).

The present techniques may be advantageous from a user privacy perspective. This is because, as shown in FIG. 5B, the new class is stored on the electronic apparatus 100, rather than being stored in the cloud or added to the base portion of the classifier that other users can use/access. However, it may be desirable for the new class defined by the user to be shared across the user's other devices (e.g., from a smartphone to their laptop, virtual assistant, robot butler, smart fridge, etc.). Thus, the method may further include sharing the new class stored in the local portion of the classifier with one or more devices used by the user of the electronic apparatus. This may happen automatically. For example, if the machine learning model is used as part of a camera application, when the model is updated on a user's smartphone, the model may automatically be shared with any of the user's other devices running the same camera application. Thus, the sharing may form part of a software application synchronization across multiple devices.

In some cases, e.g., with the user's permission, the method may include sharing the new class stored in the local portion of the classifier with a server comprising the base portion of the classifier.

Those skilled in the art will appreciate that while the foregoing has described one or more embodiments, the present techniques should not be limited to the specific configurations and methods disclosed above. Those skilled in the art will recognize that present techniques have a broad range of applications, and that embodiments may take a wide range of modifications without departing from any inventive concept(s) as defined in the appended claims.

Various embodiments may be implemented with software including one or more instructions stored in the storage medium (machine-readable storage media) readable by a machine (e.g., computer). The device is a device that is operable to call one instruction among instructions stored in the storage medium and execute the instructions, and may include an electronic apparatus (for example, electronic apparatus 100) according to one or more embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the configuration in which a data is semi-permanently stored in a storage medium from the configuration in which a data is temporarily stored in a storage medium.

The method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g., PLAYSTORE™) directly between two user devices. In the configuration of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or other operations may be added.

The invention claimed is:

1. A method for controlling an electronic apparatus, the method comprising:
  obtaining, from an external server, a neural network model trained to detect an object corresponding to at least one class;
  obtaining a user command for detecting a first object corresponding to a first class, the user command including at least one keyword associated with the first class; and
  based on the first object not corresponding to the at least one class, obtaining, by the electronic apparatus, a new neural network model based on the neural network model obtained from the external server and information of the first object that is personalized based on a user of the electronic apparatus, wherein the new neural network model is stored on the electronic apparatus and is obtained by locally extending the neural network model on the electronic apparatus, to detect the first object corresponding to the first class in addition to detecting the object corresponding to the at least one class.

2. The method as claimed in claim 1, wherein the trained neural network model comprises:
  a feature extraction module configured to extract a feature value of an object; and
  a classification value obtaining module configured to obtain a classification value of the object based on the extracted feature value.

3. The method as claimed in claim 2, wherein:
  the obtaining the user command comprises obtaining an image of the first object; and
  the obtaining the new neural network model comprises:
    obtaining a first feature value of the first object by inputting the obtained image of the first object to the feature extraction module, and
    obtaining a new classification value obtaining module based on the obtained first feature value and the classification value obtaining module.

4. The method as claimed in claim 3, wherein:
the classification value obtaining module comprises a weight vector comprising a plurality of column vectors; and
the obtaining the new classification value obtaining module comprises:
generating a first column vector based on an average value of the first feature value, and
obtaining the new classification value obtaining module by adding the first column vector as a new column vector of the weight vector.

5. The method as claimed in claim 4, further comprising regularizing the obtained new classification value obtaining module based on a predefined regularizing function.

6. The method as claimed in claim 1, wherein the trained neural network model is trained based on a loss function comprising a predefined regularizing function to prevent overfitting.

7. The method as claimed in claim 1, further comprising:
based on the user command being obtained, determining whether the first object corresponds to the at least one class,
wherein the determining comprises:
obtaining an image of the first object,
obtaining a first feature value of the first object by inputting the image of the first object to the neural network model, and
determining whether the first object corresponds to the at least one class by comparing the first feature value with a weight vector of the neural network model.

8. An electronic apparatus comprising:
a memory comprising at least one instruction; and
a processor configured to execute the at least one instruction to:
obtain, from an external server, a neural network model trained to detect an object corresponding to at least one class,
obtain a user command for detecting a first object corresponding to a first class, the user command including at least one keyword associated with the first class, and
based on the first object not corresponding to the at least one class, obtain a new neural network model based on the neural network model obtained from the external server and information of the first object that is personalized based on a user of the electronic apparatus, wherein the new neural network model is stored on the electronic apparatus and is obtained by locally extending the neural network model on the electronic apparatus to detect the first object corresponding to the first class in addition to detecting the object corresponding to the at least one class.

9. The electronic apparatus as claimed in claim 8, wherein the trained neural network model comprises:
a feature extraction module configured to extract a feature value of an object; and
a classification value obtaining module configured to obtain a classification value of the object based on the extracted feature value.

10. The electronic apparatus as claimed in claim 9, wherein the processor is further configured to execute the at least one instruction to:
obtain an image of the first object;
obtain a first feature value of the first object by inputting the obtained image of the first object to the feature extraction module; and
obtain a new classification value obtaining module based on the obtained first feature value and the classification value obtaining module.

11. The electronic apparatus as claimed in claim 10, wherein:
the classification value obtaining module comprises a weight vector comprising a plurality of column vectors; and
the processor is further configured to execute the at least one instruction to:
generate a first column vector based on an average value of the first feature value, and
obtain the new classification value obtaining module by adding the first column vector as a new column vector of the weight vector.

12. The electronic apparatus as claimed in claim 11, wherein the processor is further configured to execute the at least one instruction to regularize the obtained new classification value obtaining module based on a predefined regularizing function.

13. The electronic apparatus as claimed in claim 8, wherein the trained neural network model is trained based on a loss function comprising a predefined regularizing function to prevent overfitting.

14. The electronic apparatus as claimed in claim 8, wherein the processor is further configured to execute the at least one instruction to:
obtain an image of the first object;
obtain a first feature value of the first object by inputting the image of the first object to the neural network model; and
determine whether the first object corresponds to the at least one class by comparing the first feature value with a weight vector of the neural network model.

15. A non-transitory computer-readable recording medium having recorded thereon instructions executable by at least one processor to perform a method for controlling an electronic apparatus, the method comprising:
obtaining, from an external server, a neural network model trained to detect an object corresponding to at least one class;
obtaining a user command for detecting a first object corresponding to a first class, the user command including at least one keyword associated with the first class; and
based on the first object not corresponding to the at least one class, obtaining, by the electronic apparatus, a new neural network model based on the neural network model obtained from the external server and information of the first object that is personalized based on a user of the electronic apparatus, wherein the new neural network model is stored on the electronic apparatus and is obtained by locally extending the neural network model on the electronic apparatus to detect the first object corresponding to the first class in addition to detecting the object corresponding to the at least one class.

16. The non-transitory computer-readable recording medium as claimed in claim 15, wherein the trained neural network model comprises:
a feature extraction module configured to extract a feature value of an object; and
a classification value obtaining module configured to obtain a classification value of the object based on the extracted feature value.

17. The non-transitory computer-readable recording medium as claimed in claim 16, wherein:

the obtaining the user command comprises obtaining an image of the first object; and the obtaining the new neural network model comprises:

obtaining a first feature value of the first object by inputting the obtained image of the first object to the feature extraction module, and obtaining a new classification value obtaining module based on the obtained first feature value and the classification value obtaining module.

18. The non-transitory computer-readable recording medium as claimed in claim 17, wherein:

the classification value obtaining module comprises a weight vector comprising a plurality of column vectors; and the obtaining the new classification value obtaining module comprises:

generating a first column vector based on an average value of the first feature value, and obtaining the new classification value obtaining module by adding the first column vector as a new column vector of the weight vector.

19. The non-transitory computer-readable recording medium as claimed in claim 15, wherein the trained neural network model is trained based on a loss function comprising a predefined regularizing function to prevent overfitting.

20. The non-transitory computer-readable recording medium as claimed in claim 15, wherein the method further comprises:

based on the user command being obtained, determining whether the first object corresponds to the at least one class, wherein the determining comprises:

obtaining an image of the first object, obtaining a first feature value of the first object by inputting the image of the first object to the neural network model, and determining whether the first object corresponds to the at least one class by comparing the first feature value with a weight vector of the neural network model.

* * * * *